March 29, 1938.    F. A. GAUGER    2,112,397
AUTOMATIC VALVE AND SYSTEM OF CONTROL THEREFOR
Filed March 7, 1935

INVENTOR.
Frank A. Gauger
BY
ATTORNEY.

Patented Mar. 29, 1938

2,112,397

UNITED STATES PATENT OFFICE 2,112,397

AUTOMATIC VALVE AND SYSTEM OF CONTROL THEREFOR

Frank A. Gauger, Milwaukee, Wis., assignor to Minneapolis-Honeywell Regulator Company, Minneapolis, Minn., a corporation of Delaware Application March 7, 1935, Serial No. 9,744

9 Claims. (Cl. 236—84)

This invention relates to an automatic valve and a system of control therefor.

Objects of this invention are to provide an automatic fluid valve, such for example as a gas valve, which is so constructed that it has a quick opening and closing main valve and also has a quick opening and closing minimum adjustment, such for instance as a minimum flame adjustment, and which also may gradually throttle between the open and closed position of the main valve, the device being so made that it has a final quick closing motion when approaching the completely throttled position prior to the closing of the minimum flame adjustment.

Further objects are to provide a single diaphragm valve which has a main valve and which has an auxiliary valve controlling a minimum flame adjustment, in which the single diaphragm controls both the main valve and the auxiliary valve, in which the main valve may snap open suddenly or may suddenly close or may throttle between the two positions independently of the action of the auxiliary valve that controls the minimum flame, and in which the auxiliary valve may also be controlled to move to full open or full closed position without fluttering, irrespective of any sudden variation in gas pressure in the gas line, thereby guarding against irregularities in the action of the valve even under severe conditions and still insuring complete opening for the auxiliary valve, when the system so demands, to have a full open minimum flame supply when so called for.

Further objects are to provide a novel form of automatic valve and system therefor in which the main valve may be controlled by an electrical system under the control of a thermostat, and in which the valve may be either additionally or separately controlled by one or a plurality of gas thermostats, in which these gas thermostats may be located at widely spaced points and each individually causing closing of the valve, in which each of the gas thermostats may be set to control at its individual temperature setting. For example, one may be set for a 2° temperature variation, and another for a 20° temperature variation, as, for instance, one may be located in an air duct or room or a plurality may be located in different ducts and different rooms, and still another may be located in the bonnet of a furnace, for instance, and set for a wide temperature range, whereas the remaining gas thermostats may be set for a small temperature differential.

Further objects are to provide a construction in which the electrical equipment may be dispensed with and the valve may be controlled manually or may be locked open manually and may be automatically controlled solely by the gas thermostats, or other throttling thermostats.

Further objects are to provide a construction of automatic valve which may be used in a temperature control system without requiring any snap action thermostats, but which nevertheless will throttle down to a minimum flame adjustment and which will thereafter either remain open at the minimum flame setting or snap closed with a quick automatic action, although the thermostats are not snap action thermostats, and which will again snap open, so far as the minimum flame adjustment is concerned, to full open minimum flame.

A further object of this invention is to provide a construction in which the minimum flame adjustment may be made for any number of burners—one, two, three or any desired number in fact—so that the minimum flame snaps on full open for the desired number of burners or fully closed, and further to provide a construction of minimum flame adjustment and valve therefor such that violent fluctuations in the line will not cause a flutter or irregular action of the automatic minimum flame valve.

Further objects are to provide a construction which, although having all of the features hereinabove enumerated, is nevertheless relatively simple, which is very easy to produce, and which does not require careful and elaborate adjustment, but which, on the other hand, is substantially foolproof and relatively rugged in construction.

In general, this invention is an improvement over that disclosed in my copending application Serial Number 747,368 for an Automatic valve filed October 8, 1934, Patent Number 2,051,294.

An embodiment of the invention is shown in the accompanying drawing, in which.

Figure 1:
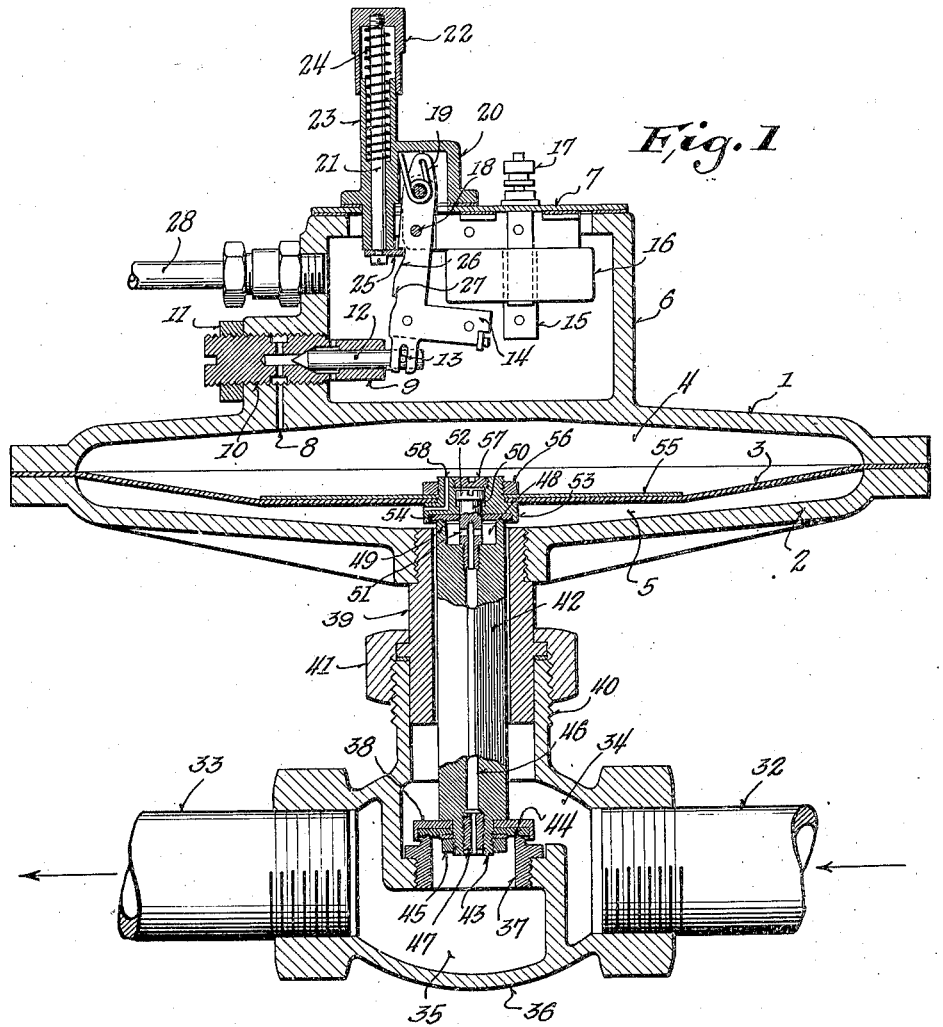
Figure 1 is a vertical sectional view through the device with parts broken away.

Referring to the drawing, it will be seen that the automatic diaphragm valve comprises a casing having an upper and a lower portion 1 and 2, between which a diaphragm 3 is clamped, thus dividing the casing into an upper compartment 4 and a lower compartment 5.

The upper portion 1 of the casing is continued upwardly to form an auxiliary housing 6 provided with a cover 7.

The interior of the auxiliary housing communicates with the upper chamber 4 of the casing by means of a small passageway or bleed 8. This pasageway 8 communicates with the passageway through the valve body portion 9, such valve portion being screwed into the threaded aperture 10 and being locked in place by a lock nut 11.

The movable portion of the small valve comprises a needle plunger 12 provided with small trunnions or pins 13 which are operated by a slotted arm carried by the armature 14 of an electric relay. The stationary core of the relay is indicated by the reference character 15 and the energizing coil or winding by the reference character 16. The terminals of the coil are connected to binding posts 17. The armature is pivoted, as indicated at 18, and a spring 19 is provided and is mounted within the hollow portion of a small fitting 20 secured to the cover 7. The armature 14 may, if desired, be provided with a shading coil, as shown in Figure 1.

The fitting 20 forms a guide for a manually manipulable plunger 21 which is screwed into an upper thumb piece 22 and which latter telescopically slides over a tubular extension 23 formed integrally with the fitting 20. A spring 24 is provided which urges the plunger upwardly.

The plunger has a roughly semi-circular disk 25 clamped to its lower end and forming a stop for the upward travel of the plunger. This disk is adapted when the plunger is depressed to ride over the bevelled portion 26 formed on the outer side of the armature and to lock beneath the shoulder 27 formed on such face of the armature, thereby urging the armature inwardly towards relay closed position and opening the valve, the portion 25 being locked beneath the shoulder 27 and holding the plunger in place.

Thus the relief valve for the relief bleed 8 may be opened by means of the manually depressible member 22, but it is to be noted further that when current is furnished the relay, that the armature is drawn inwardly and the manually operable member is thus released and snaps back to its initial position. Normally the device will be operated directly from the relay without the use of the manual member. When the relay is energized, the valve 12 is drawn to its open position and when the relay is deenergized, the valve is moved backwardly to closed position. The fluid, such as gas, for instance, collecting in the casing 6 is discharged by means of the discharge pipe 28 or bleed line.

The discharge pipe or bleed line 28 leads to one or a plurality of gas thermostats, for instance as indicated at 29 and 30, and from thence either leads to the waste, to the pilot burner line 31, as indicated, to the combustion chamber or to any point desired. The line 28 and the thermostats constitute restricted by-pass means for by-passing gas entering the upper compartment to the pilot or waste line.

The main valve controls the flow of pressure fluid from the inlet portion 32 to the outlet portion 33, through the inlet duct 34 and the outlet duct 35 of the body portion 36. This body portion is provided with a removable valve seat 37 against which the movable valve member 38 is adapted to seat. This valve member may be provided with a gasket, as shown, or may be formed in any suitable manner.

The lower portion 2 of the diaphragm chamber is provided with a threaded lower opening into which is screwed a fitting 39 which is removably clamped to the threaded extension 40 of the body portion 36 of the valve by means of the union or coupling member 41.

The member for transmitting the motion of the diaphragm 3 to the valve 38 preferably comprises a relatively heavy polygonal-shaped valve stem or member 42 which is guided within the fitting or neck 39.

The member 42 is provided with a reduced threaded portion 43 onto which is slipped the valve 38 and the gasket 44. Thereafter a washer is positioned, as shown, and a nut 45 locks the assembly in place against the shouldered bottom of the member 42, as clearly shown in Figure 1. The member 42 is provided with a passageway 46 therethrough and with an enlarged internally threaded lower part. This internally threaded portion receives the screw threaded bushing 47 which is provided with a small aperture determining the minimum flame adjustment when the device is used as a gas valve.

For example, if one burner is used, the sleeve 47, having a certain predetermined size of passageway therethrough, is employed. If a two-burner construction is controlled by the valve, the sleeve, as shown at 47, with, however, a larger aperture therethrough, is employed. Obviously three, four or any other number of burners would in each case have a still larger bore formed in the member 47.

The member 47, therefore, controls the minimum flame adjustment and the flow of gas through the member 47 is independent of the opening or closing of the main valve 38.

The member 42 constitutes the valve stem, it is true, but it is so formed at the upper portion thereof that it also constitutes one part of the minimum flame valve or automatic auxiliary valve. This is accomplished by providing an enlarged recess 48 in the upper portion of the member 42 and thereby forming an annular valve seat about such recess. The upper end of the annular ring 49 of the member 42 is bevelled and constitutes the actual valve seat. A small shouldered fitting 50 has its reduced threaded portion screwed into the upper end of the opening 46 of the member 42 and is provided with one or more passageways 51 communicating with the passageway 46 through the member 42. The small fitting 50 is, in reality, of screw like construction and has a flat screw head 52 or flange at its upper portion.

A small fitting constituting, in reality, a valve is indicated by the reference character 53 and carries a gasket 54 which directly cooperates with the valve seat or ring member 49 to control the minimum flame. The member 53 has a reduced portion which passes through the diaphragm 3 and through the upper plate 55 carried by the diaphragm. A nut 56 is screwed onto the reduced portion of the member 53 and locks the member to the diaphragm.

The member 53 is provided with an enlarged aperture in which the head 52 of the flanged pin or fitting 50 freely slides. This aperture is constricted to provide shoulders adapted to engage the under side of the flange or head 52 so that when the diaphragm rises a predetermined distance, the motion is thereafter transmitted to the member 42. The aperture in the member 53 is closed by means of a plug 57.

It will be seen that a considerable amount of play is allowed between the member 53 carried by the diaphragm and the fitting 50 and consequently the diaphragm has a material motion upwardly before motion is imparted to the main valve. However, as soon as the diaphragm moves upwardly even a minute distance, the minimum flame valve is opened and gas flows downwardly through the passageway 46 from the lower chamber 5 of the diaphragm casing.

Gas is supplied to the diaphragm casing directly from the inlet chamber 34 of the main valve 36 upwardly through the neck 39 and around the polygonal-shaped member 42, as it is obvious that a free passageway is thus afforded around the member 42.

Obviously, as soon as the minimum flame valve or member 53 rises even a small distance from the valve seat 49, full minimum flame flow is provided. There is a relatively large area that is immediately opened peripherally around the minimum flame valve many times greater than the area furnished by the passageway through the minimum flow controlling member 47 at the lower portion of the valve stem 42.

Restricted by-pass means is provided in the form of a small aperture 58 through the valve or fitting 53, as shown in Figure 1, so that the upper compartment 4 above the diaphragm is fed through this small restricted bleed.

Figure 2:
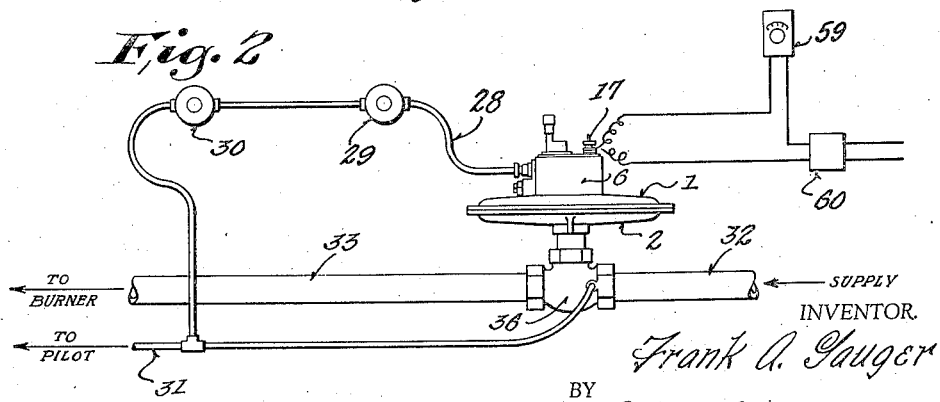
Figure 2 is a fragmentary view showing a part of the system in which the valve is employed.

If the device is used with the ordinary type of thermostat, as indicated at 59 in Figure 2, such thermostat is connected to the binding posts 17 and consequently to the coil 16 of the relay, see Figure 1, and the electrical circuit may be supplied from a small bell ringing type or step down transformer 60.

In operation, assume that the thermostat 59 closes. Under these conditions the plunger 12, see Figure 1, will be retracted and the upper chamber 4 above the diaphragm will be vented through the pipe 28 and if the gas thermostats 29 and 30 are opened, pressure will be immediately relieved through the pipe 28 to any suitable exhaust point. The diaphragm will thus quickly move upwardly and thus will quickly open the main valve. It is apparent that the motion of the diaphragm will be transmitted through the member 50 and the member 42 to the main valve. Thus a quick opening of the main valve will occur.

Now assume that the relay closes, that is to say, is deenergized. A quick closing of the main valve will result. On the other hand, assume that the main valve is opened, as previously stated, and that the gas thermostats now take control. It is apparent that as many of these thermostats as desired may be placed in series, and that they may be located at widely different points and set for widely different temperature ranges, as described hereinbefore. If any one of the thermostats starts to throttle down, it is apparent that the main valve will throttle beween open and closed position. Additionally, if the main valve should completely close, it is apparent that the minimum flame valve or member 53 is at its uppermost position with reference to the member 50 and consequently does not engage the minimum flame valve seat 49. Consequently, the minimum flame is on for its full value, for which the adjustment 47 has been provided.

If, however, as it sometimes happens, this minimum flame supplies too much heat, the minimum flame will be cut off by a snap action, as is apparent when the following is considered. If any one of the thermostats 29 cuts off completely, it is obvious that the minimum flame valve or movable member 53 will approach closer and closer to its valve seat 49. However, at no time does it have any throttling action, as the opening through the bushing or minimum flame adjustment member 47 is much smaller than the large peripheral opening around the valve seat 49.

However, as the minimum flame valve approaches closed position, it will complete its closing stroke with a snap action as the area 48 below such minimum flame valve is at substantially atmospheric pressure when the minimum flame valve closes, and, consequently, as the minimum flame valve closes, there will be a decided difference in pressure above and below the diaphragm causing a quick snap action closing motion.

On the other hand, assume that at a later time the minimum flame is called for by the gas thermostats. It is obvious that the diaphragm will start to move upwardly and as soon as the movable member 53 or minimum flame valve member clears the seat 49, there will immediately be gas pressure below the minimum flame valve 53 and this will enhance the difference in pressure below and above the diaphragm tending to raise the diaphragm so that the minimum flame is turned on with a quick or snap action.

It will be seen that a novel form of valve and system therefor has been provided by this invention which provides for quick opening and closing of the main valve, and which provides a throttling action between the open and closed position of the main valve, and also provides a quick opening and closing minimum flame valve.

It is apparent also that the device can be used without the electrical system, if so desired. In this case the needle valve or plunger 12, see Figure 1, will be locked in open position by the manual means and will be left in such open position. Under this condition, the same action as hereinbefore described will take place, the only difference being that no part of the system is now under the control of the electric circuit.

Further than this, it will be seen that the system allows its ready incorporation in a two-wire electric control system and does not require any snap action thermostat, either of the electrical type or of the gas type.

It will be seen further that the device is foolproof and is independent of any manipulation that may be made by an unskilled operator of the thermostat. The thermostat may be moved on and off as desired and the same quick motion of the device will occur. There can be no striking back in the burner as the burner, having been designed for a certain minimum flame in accordance with the usual practice, will have this full minimum flame or else none. In other words, it will have at least a full minimum flame wherever there is any gas flow whatsoever and this will be supplied by a quick motion valve. If, on the other hand, a larger gas flow is desired, the additional flow will be furnished through the main valve.

It is to be noted particularly that although this invention provides an automatic valve having the several desirable characteristics hereinabove enumerated, nevertheless the construction is simple and is free of delicate parts and may be easily made and easily assembled. The valve requires no delicate adjustment. Any fluctuation in line pressure will not be reflected as a fluttering of the minimum flame valve as this minimum flame valve has a relatively large motion prior to closing and great variation in line pressure will not produce any fluttering whatsoever.

The valve, in other words, is not dependent upon very accurate, careful and close adjustment but is substantially foolproof in its action and will withstand, as stated, wide variations in line pressure.

Although this invention has been described in considerable detail, it is to be understood that such description is intended as illustrative rather than limiting, as the invention may be variously embodied and is to be interpreted as claimed.

I claim:

1. An automatic single diaphragm valve comprising a casing provided with a diaphragm dividing said casing into two compartments, a main valve biased towards closed position, means extending from said main valve towards said diaphragm, in auxiliary valve seat formed in said means, an auxiliary valve movable within said means and cooperating with said auxiliary valve seat and directly connected to said diaphragm and forming an operative connection between said diaphragm and said means, said means having a restricted minimum flow duct therein and said auxiliary valve controlling the minimum flow through said duct.

2. An automatic single diaphragm valve comprising a casing, a diaphragm dividing said casing into two compartments, a main valve, a standard projecting from said main valve and having a minimum flow duct therein, a valve seat carried by said standard, an auxiliary valve cooperating with said valve seat and controlling said minimum flow duct, means positively connecting said auxiliary valve and said diaphragm and having limited motion with respect to said standard and forming the operative connection between said diaphragm and said standard, and means for controlling relative pressures on opposite sides of said diaphragm.

3. An automatic single diaphragm valve comprising a casing, a diaphragm dividing said casing into two compartments, a main valve, a standard projecting from said main valve and having a minimum flow duct therein, a valve seat carried by said standard, an auxiliary valve cooperating with said valve seat and controlling said minimum flow duct, means positively connecting said auxiliary valve and said diaphragm and having limited motion with respect to said standard and forming the operative connection between said diaphragm and said standard, and means for controlling relative pressures on opposite sides of said diaphragm, said auxiliary valve having a relatively large area adjacent said valve seat.

4. In a valve device having a fluid flow inlet and outlet, a main valve for throttling said fluid flow, an adjustable channeled main valve stem embodying a minimum flow valve seat, a fluid pressure operated quick motion minimum flow valve cooperating with said minimum valve seat for controlling said fluid flow, and pilot flow means controlling the operation of both said valves.

5. In a valve device having a fluid flow inlet and outlet, a main valve for throttling said fluid flow, an adjustable channeled main valve stem embodying a minimum flow valve seat, a fluid pressure operated quick motion minimum valve cooperating with said minimum flow valve seat, and pilot flow means controlling the operation of both said valves.

6. In a valve of the class described comprising a main throttling valve having an adjustable leak, a quick motion valve controlling said leak, fluid pressure diaphragm means effecting the movement of said valves, and pilot flow means controlling said diaphragm means.

7. In a fluid flow line pressure operated diaphragm valve having an inlet and outlet, the combination of a quick motion valve and a leak port throttling valve, both of said valves controlling the fluid flow through a main valve port, a pilot flow means for producing differential line pressure for controlling the movement of said diaphragm, said diaphragm effecting the operation of said valves.

8. In a control system comprising a fluid flow line, a fluid pressure operated diaphragm, a quick motion valve and a leak port throttling valve connected to said diaphragm, both of said valves controlling the fluid flow through a single main valve port, a pilot flow port, a pilot device controlling said pilot flow port for producing differential line pressure for controlling the movement of said diaphragm and the action of said valves.

9. In a device of the class described, a pressure motor having a movable wall, a first valve connected to said movable wall and operated thereby, means for varying the relative pressures on opposite sides of said wall to move said valve to and from closed position, said valve being of sufficient size and so disposed with respect to the path of fluid flow that the change in the pressure differential on opposite sides thereof in opening is effective to cause an initial quick movement thereof towards open position, a throttling valve member supported by said first valve and axially aligned therewith, and means constituting a by-pass around said throttling valve member, said means being controlled by said first valve and operative when said first valve is opened to insure a minimum flow of fluid regardless of the position of said throttling valve member.

FRANK A. GAUGER.